United States Patent [19]
Droullard et al.

[11] Patent Number: 6,044,597
[45] Date of Patent: Apr. 4, 2000

[54] FRICTION REDUCING MEMBER FOR DOCK SEAL

[75] Inventors: Jack T. Droullard, Peosta; Greg J. Thill, Dubuque, both of Iowa

[73] Assignee: Rite-Hite Holding Corporation, Milwaukee, Wis.

[21] Appl. No.: 09/062,177

[22] Filed: Apr. 17, 1998

[51] Int. Cl.[7] .................................................. E04H 14/00
[52] U.S. Cl. ............................................ 52/173.2; 52/2.12
[58] Field of Search ...................................... 52/2.12, 173.2

[56] References Cited

U.S. PATENT DOCUMENTS

| | | | |
|---|---|---|---|
| 4,805,362 | 2/1989 | Frommelt et al. | 52/173.2 |
| 4,825,607 | 5/1989 | Frommelt et al. | 52/173.2 |
| 4,873,800 | 10/1989 | Frommelt et al. | 52/173.2 |
| 4,981,631 | 1/1991 | Frommelt | 52/173.2 |
| 5,174,075 | 12/1992 | Alten | 52/173.2 |
| 5,174,084 | 12/1992 | Alten | 52/173.2 |
| 5,195,285 | 3/1993 | Alten | 52/173.2 |
| 5,282,342 | 2/1994 | Brockman et al. | 52/173.2 |

Primary Examiner—Carl D. Friedman
Assistant Examiner—Kevin D. Wilkens
Attorney, Agent, or Firm—Marshall, O'Toole, Gerstein, Murray & Borun

[57] ABSTRACT

A windstrap assembly for a dock seal mounted on a building wall and which includes a fabric encased foam side pad mounted to the wall, and a vertically hanging curtain. The assembly includes a resilient member with two ends—one mountable to the curtain, and the other mountable to the side pad adjacent the wall. A friction reducing member is disposable between the resilient member and the pad fabric such that it frictionally engages and moves with the resilient member related to the side pad.

7 Claims, 4 Drawing Sheets

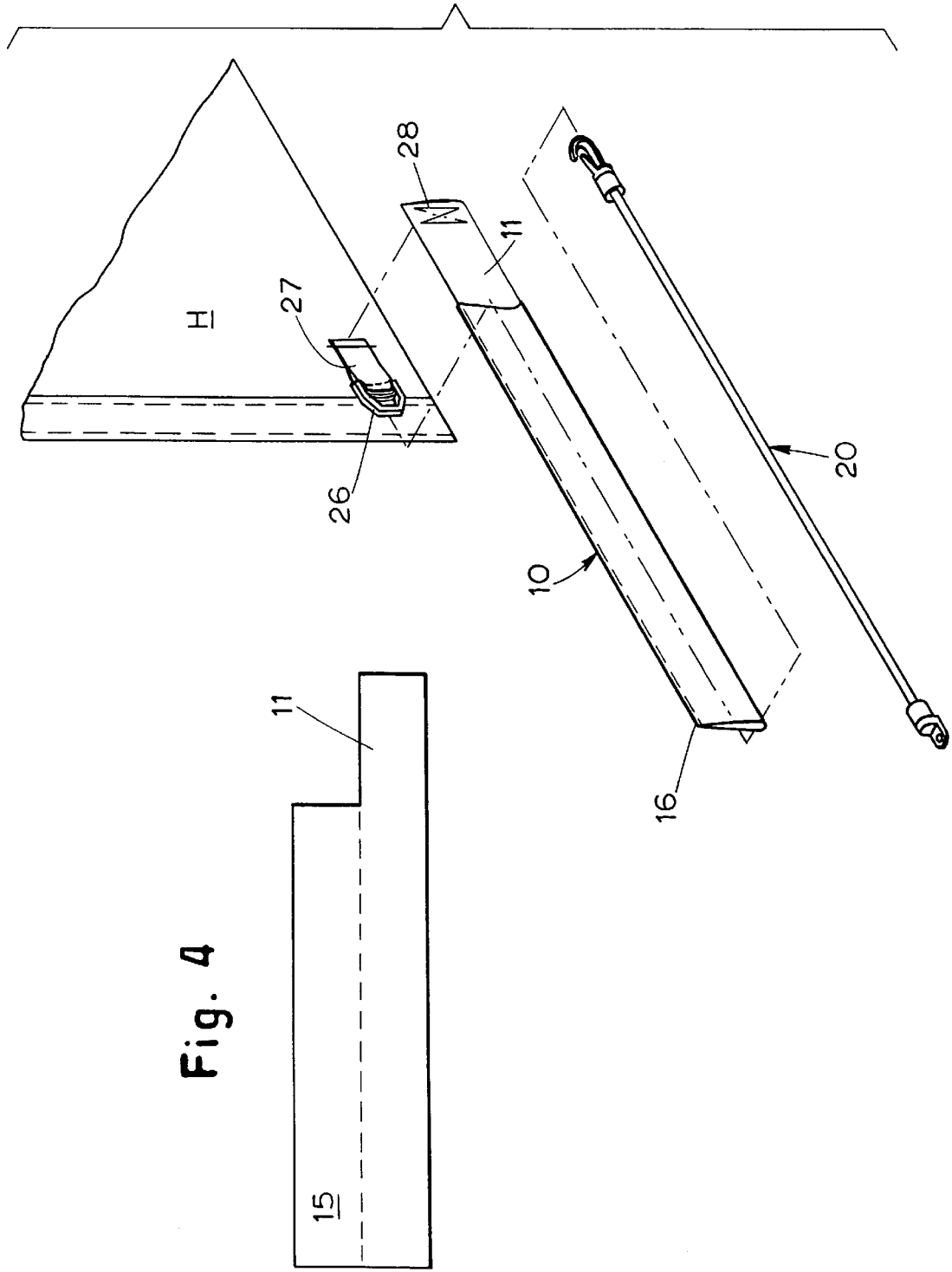

FRICTION REDUCING MEMBER FOR DOCK SEAL

FIELD OF THE INVENTION

The present invention is directed generally to dock seals and shelters, and particularly to a windstrap design for the head curtain of such a unit.

BACKGROUND OF THE INVENTION

Dock seals and shelter are typically employed at loading docks for the purpose of forming a seal or at least a barrier to the elements between the back of a vehicle parked at the loading dock for loading and unloading purposes, and the building or warehouse within. A traditional dock shelter, such as the WG402 unit sold by Frommelt Products Corporation of Dubuque, IA, employs a rigid frame structure mounted to the building wall adjacent the loading dock. Coupled to this rigid structure, are a pair of side curtains which extend inward from the frame structure toward the vehicle. A head curtain extending downwardly from the frame structure and into the opening is also employed. As the vehicle backs into the shelter, the side and head curtains deflect in toward the dock under the influence of impact from and frictional engagement with the truck. A windstrap is often employed between the frame structure and the lateral ends of the head curtain. The purpose of such a windstrap is to prevent the head curtain from undue movement caused by wind, particularly movement that would, for example, cause the head curtain to flip up on top of the supporting structure and out of contact with a vehicle. The windstrap disposed between the frame structure and the ends of the head curtain basically prevents the head curtain from moving beyond a certain range. At the same time, the windstrap provides the necessary flexibility to allow the head curtain to move in response to the truck without placing undue stresses on the curtain. If, for example, the ends of the head curtain were attached directly to the frame structure, as opposed to being indirectly attached through the windstrap, the curtain would be stretched between such connections each time a vehicle backed into the shelter. This undue stress would be undesirable, thus suggesting the need for use of a windstrap.

Dock seals also use a windstrap. A dock seal may be generally distinguished from a dock shelter in that a dock seal typically has resilient foam pads as a supporting structure, as opposed to the rigid frame structure of conventional shelters. These resilient foam pads are disposed and intended to be impacted by the sidewalls of the backing vehicle, to compress the pads and thus form a tight seal between the sidewalls and the pads. In certain installations, it is advantageous to also have a head pad across the top of such a loading dock seal. Often, however, application issues will indicate that a head curtain as opposed to a head pad is desirable. Several dock seals manufactured and sold by Frommelt Products Corporation of Dubuque, IA use a head curtain in a dock seal. These products include Frommelt's TP-903 dock seal, its L-pad dock seal, and the ELIMINATOR™ dock seal, which combines both foam side members, as well as side curtains as seen in conventional dock shelters. Each of these products includes a windstrap connected to the head curtain for the same purpose as the windstrap described in regard to the dock shelters. In a dock shelter, however, the windstrap is connected to the rigid frame structure immediately behind the head curtain. In a dock seal, however, the only structure immediately behind the head curtain is the foam pad, which is not suitable for anchoring of a windstrap. Accordingly, windstraps on dock seals typically are connected to the head curtain, and are then anchored into a rigid structure, such as a wood backer disposed behind the side pad and adjacent the building wall. Thus, as seen in prior art FIGS. 1 and 2, the windstrap turns a corner from the front of the head curtain, and then extends along the side surface of the side pad before being secured at the rear of the side pad to the backerboard.

Such an arrangement of the windstrap can lead to undue wear of the windstrap. Each time a trailer backs against the head curtain, the windstrap is stretched. As a result, the windstrap rubs along the fabric in which the foam pad is encased, and also rubs along the corner of the foam pad. Over time, this friction between the windstrap and the pad base fabric can abraid the windstrap, leading to premature failure. This becomes not only a maintenance and cost issue, but also an issue of effectiveness of the seal. When a windstrap fails, the head curtain of the seal can be subject to undesirable blowing and billowing for windy conditions.

SUMMARY OF THE INVENTION

In order to minimize or eliminate the wear issues associated with conventional windstraps, the invention provides a pocket for housing the windstrap. According to a preferred embodiment of the invention, the pocket is a tube of fabric that fits over and extends along the windstrap. The pocket is secured at one end, preferably to the head curtain. Since it is secured only at one end, the pocket is free to move along with the windstrap. Accordingly, as the windstrap is stretched and unstretched by virtue of the motion of the head curtain, the pocket can move along with the windstrap. As a result, there is significantly less relative motion between the windstrap and the pocket than there conventionally is between the windstrap and the base fabric on the foam pad. Instead, it is the pocket that primarily will have this frictional engagement with and motion relative to the base fabric. Accordingly, friction and abraiding of the windstrap are significantly minimized. This will enhance the lifetime and wear characteristics of the windstrap.

BRIEF DESCRIPTION OF THE DRAWINGS

FIG. 4 is a view of the fabric blank used to form the pocket according to an embodiment of the invention;

FIG. 5 is an exploded isometric view of the windstrap pocket according to an embodiment of the invention and showing its securement to a dock seal.

DETAILED DESCRIPTION OF THE PREFERRED EMBODIMENTS

While the invention will be described in reference to certain specific embodiments, the invention should not be so limited. Rather, the invention covers all apparatus, devices and structures falling within the scope of the appended claims.

Figure 1:
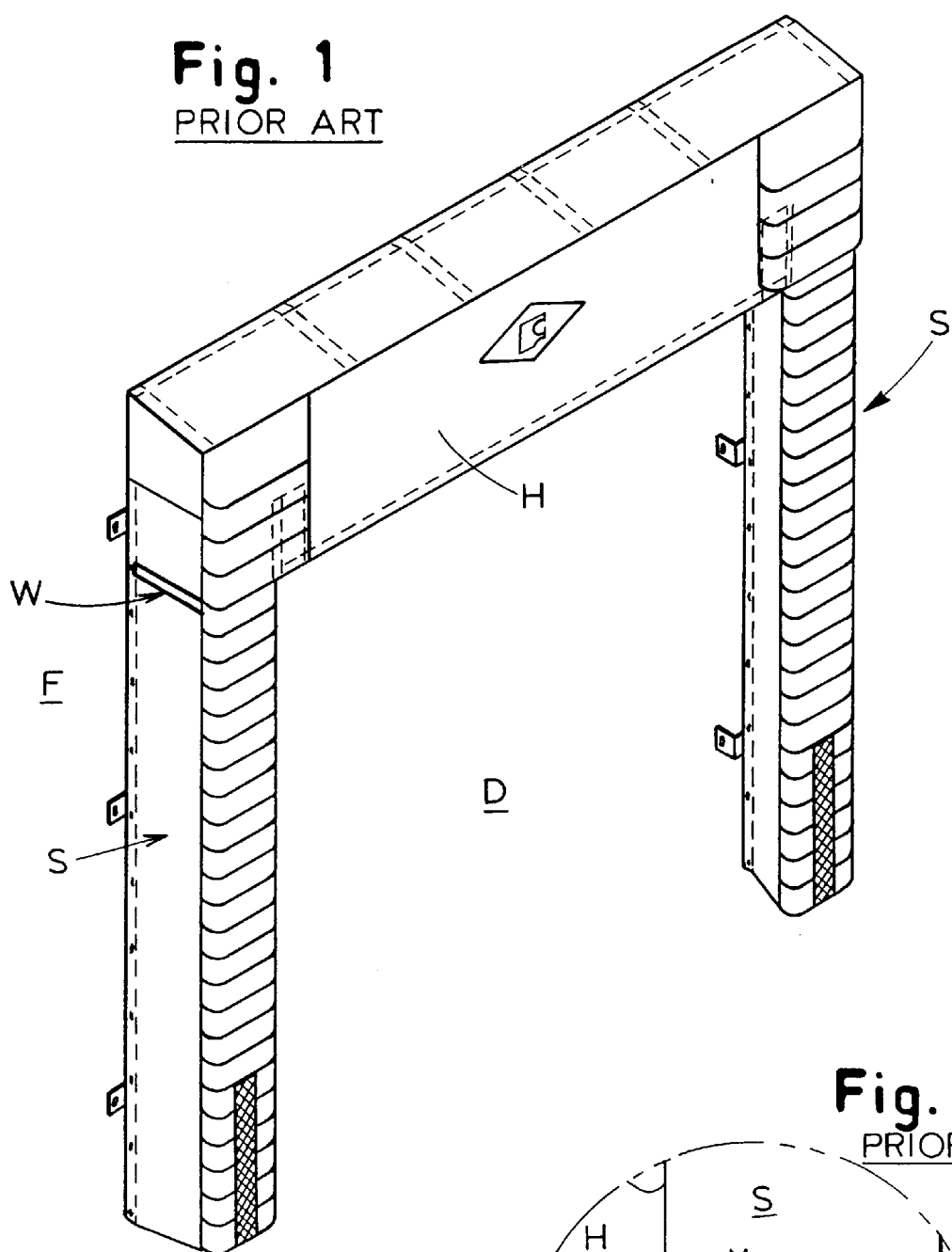
FIGS. 1–2 are prior art figures, showing a conventional dock seal and a detail of same including a windstrap.
Figure 2:
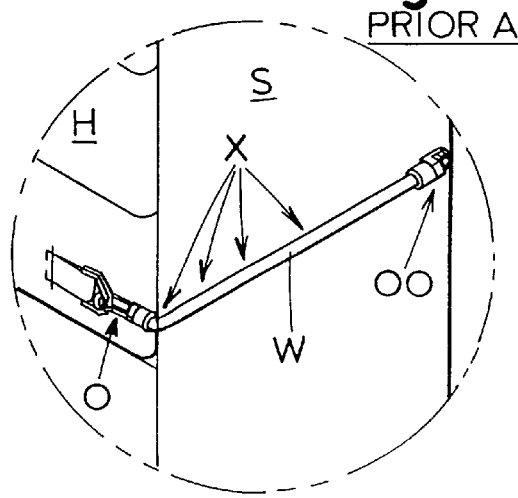
Figure 6:
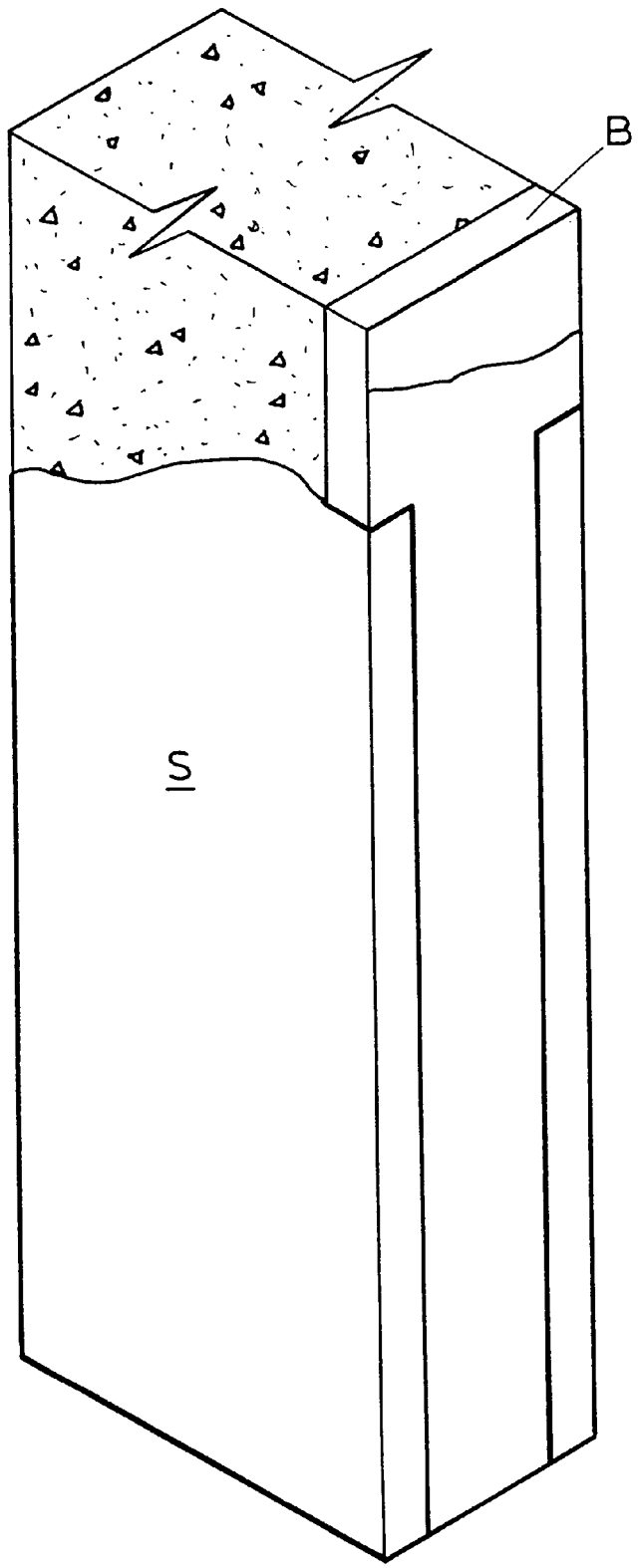
FIG. 6 is a section view of the construction of a conventional side pad.

The environment for a windstrap with which the windstrap pocket according to the invention would be used, is shown in the conventional dock seal structure in FIG. 1, as detailed in FIG. 2. The dock seal includes resilient side pads S disposed on either side of the dock opening D. Typically, the side pads are mounted on structural members such as so-called backerboards, which are in turn mounted to the wall face. A section view of the dock seal in FIG. 1 is shown in FIG. 6, which shows the foam pad S as well as the backerboard B. The seal shown FIG. 1 also includes a head curtain H that hangs down from framing structure into the path of the incoming vehicle. The head curtain is intended to engage the top of the vehicle and be pushed toward the loading dock as the vehicle backs into position. The head curtain then rests on top of the vehicle during loading and unloading. The conventional windstrap W is included to prevent the head curtain from blowing or billowing under windy conditions either when a truck is parked at the loading dock, or during the approach of the vehicle towards the dock. Typically, the windstrap is a resilient member, such as the so-called "bungee" cord material, that is secured at one end (o) to the face of the head curtain, and at its other end (oo) to the backerboard of the side pad of the dock seal. The windstrap thus holds the sides of the head curtain, and prevents it from blowing in the wind, while at the same time also allowing for rearward movement of the head curtain under the influence of a backing vehicle. Because of the resilient nature of the windstrap, the head curtain will again be pulled taut as the vehicle departs and allows the head curtain to move back to its forward position. As discussed previously, however, such conventional windstraps are subject to undue wear due to friction between the windstrap and the fabric covering the side pad in the areas indicated as "x" in FIG. 2, which problem may be exacerbated by the fact that the windstrap turns a corner between the outside surface of the side pad and the front surface of the head curtain, as shown in the detail of FIG. 2.

Figure 3:
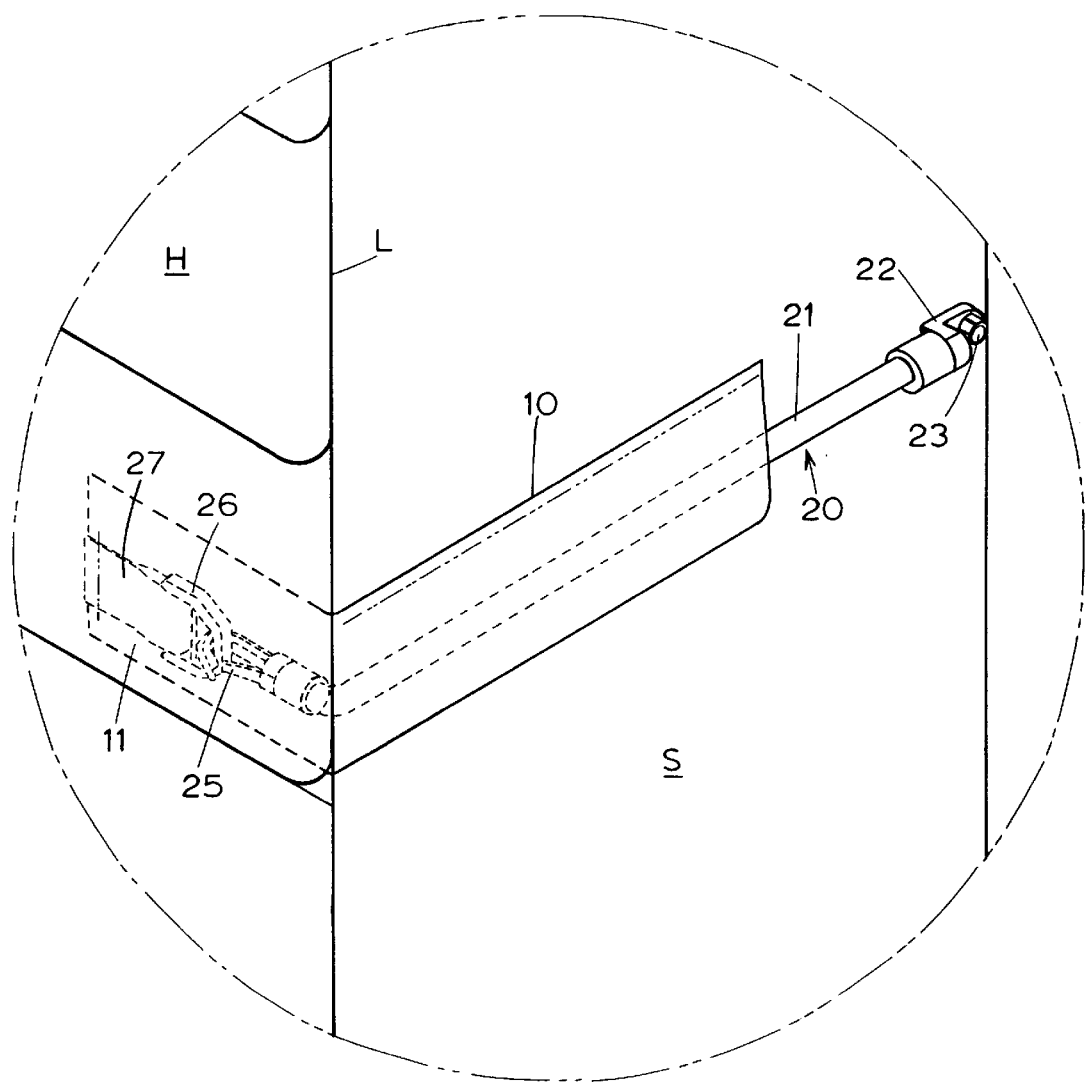
FIG. 3 is a detailed view of a dock seal according to the invention, and including the windstrap pocket.

To help eliminate or minimize this wear, a friction reducing cover, illustratively in the form of a windstrap pocket 10 is provided, as shown most clearly in FIG. 3. The windstrap itself (designated 20) is formed of a resilient member 21, illustratively in the form of shock cord or "bungee" cord, as manufactured by American Cord & Webbing under Model No. 54494. The windstrap is secured at a first end by means of a lug 22 that is bolted by means of a bolt 23 to the backerboard (not shown) of the side pad S of the dock seal. The other end of the windstrap is secured to the head curtain H. In the illustrated embodiment, the connection between the windstrap 20 and the head curtain H is spaced from the lateral edge L of the head curtain, thus requiring that the windstrap stretch around the corner of the side pad. To secure the windstrap 20 to the head curtain, the end of the windstrap includes a clip hook 25. This clip hook is received by a D ring 26 that is secured to the head curtain by means of a fabric tab 27. Because of this particular configuration of windstrap, the windstrap makes an approximate 90° turn between the side surface of the seal pad and the front surface of the head curtain. One of skill in the art, and/or with knowledge of other seal and shelter designs, will appreciate that a variety of other windstrap designs are possible. For example, the windstrap may be formed of a resilient webbed belting as opposed to "bungee" cord. In addition, hardware may not be provided for mounting the windstrap to the head curtain, and sewing or other attachment means may be employed. Further, the connection between the windstrap and the head curtain may not be disposed inwardly from the lateral edge of the head curtain. Rather, it is possible that the connection between the windstrap and the head curtain will be right at the lateral edge of the head curtain. Even so, windstraps commonly share the feature of having one end secured to relatively stationary structure, such as the backerboard, being resilient along their longitudinal length, and having a second end attached to the head curtain. Again, this prevents the head curtain from blowing in the wind, but also provides for relative movement and thus friction between the head curtain and the adjacent relatively stationary member, in this case the side pad, as the head curtain is moved into different positions by a backing vehicle. The resiliency of the windstrap may also help restore the head curtain to its normal, rest position upon departure of the vehicle.

The friction reducing member according to the invention, and specifically embodied as a windstrap pocket 10, is also shown in FIG. 3. The pocket 10 is basically a fabric tube disposed around the windstrap 20. To prevent undue movement of the pocket as the windstrap is stretched and unstretched by the action of wind and approaching and departing vehicles, a portion of the pocket is fixed relative to the windstrap. For example, in the embodiment shown in FIG. 3, the pocket is secured to the front face of the head curtain by a flap 11 of material to be described in greater detail below. The remainder of the pocket, however, is free to move along with the windstrap 20. Accordingly, as the windstrap 20 is stretched and unstretched, the pocket 10 will tend to move along with the windstrap 20 relative to the adjacent stationary structure of the side pad. Since the frictional wear and abrasion typically imparted on a windstrap is due to the windstrap moving while the base fabric of the seal pad S remains relatively stationery, such wear and abrasion is substantially eliminated. Rather, there is little or no relative movement between the windstrap 20 and the pocket 10, and the relative movement rather occurs between the pocket 10 and the base material of the relatively stationary pad S. As the material forming the pocket and the base material have significantly better wear capabilities than the material forming the windstrap, this wear is not problematic. At the same time, wear on the windstrap is significantly reduced or eliminated, thus extending its effective life. Moreover, in addition to being able to employ the windstrap pocket on new production models, the windstrap pocket can be easily retrofitted to existing structures.

The windstrap pocket shown in FIG. 3 may be formed from a piece of material 15, like that shown in FIG. 4. The material is basically rectangular, with an additional tab 11 at one end. The fabric blank is folded about the fold line shown in dotted lines in FIG. 4, and the free ends are then fastened together, illustratively by sewing. A view of the windstrap pocket in FIG. 5 shows the fastening together of the free ends along a stitch line 16 to form the fabric tube. The tab 11 on the windstrap pocket 10 is then used to secure an end of the windstrap pocket to the head curtain H. This tab 11 is illustratively fixed to the head curtain H by being sewn (as with stitching 28) between the fabric tab 27 that holds the D ring 26 and the head curtain material itself. Securing an end of the windstrap pocket either to the head curtain or to the fabric of the side pad is not believed necessary to proper functioning of the windstrap pocket. However, such securement may eliminate the possibility that the windstrap pocket would become bunched or puckered at a particular wear point. Accordingly, the best mode presently envisioned by the inventors is to secure an end of the pocket so that that end cannot move relative to the windstrap.

It should be noted that while the friction reducing member according to the invention has been disclosed as a windstrap pocket, the invention is not so limited. Rather, the friction reducing member could be a piece of fabric or other material disposed between the windstrap and the adjacent, relatively stationary base fabric of the side pad, preferably such that it could move along with the windstrap as it stretched and unstretched, so that it would achieve the object of the invention. In particular, such a friction reducing member would eliminate or minimize friction and abrasion between the windstrap and the adjacent, relatively stationary base fabric, since the friction reducing member would move along with the windstrap, and not allow such friction or abrasion. A pocket-type of friction reducing member is presently considered to be the most advantageous by the inventors, but the invention is not necessarily so limited. Further, although the invention has been described in reference to a dock seal, it is applicable to other environments, including other sealing structures such as dock shelters.

There has thus been described a friction reducing member in the form a windstrap pocket, as well as the structure of a pocketed windstrap to eliminate or minimize undue wear on a dock seal windstrap caused by friction, rubbing and abrasion between that windstrap and an adjacent, relatively stationary structure such as the base fabric on the dock seal side pad. The friction reducing member is not only disposed between the windstrap and the base fabric to minimize friction, but is also disposed to move with the windstrap relative to the base fabric so there is not relative movement between the friction reducing member and the windstrap that would lead to friction and abrasion on the windstrap.

What is claimed is:

1. In combination, an assembly comprising:
   a dock seal including at least one foam side pad, a rigid backing member disposed between the pad and a building wall, and at least one curtain including a lateral edge disposed adjacent the side pad, the side pad having a back surface disposed adjacent the backing member, a front surface disposed adjacent the curtain and a side surface joining the front and back surfaces;
   a resilient member having first and second ends and an intermediate section disposed between the first and second ends, the first end being mounted to the curtain and the second end being mounted to the backing member such that at least a first portion of the intermediate section is disposed adjacent the side surface of the side pad; and
   a friction-reducing member disposed adjacent the first portion of the intermediate section of the resilient member, the friction-reducing member being located adjacent the side surface of the side pad between the resilient member and the side surface, the friction-reducing member being adapted to frictionally engage and move with the first portion of the intermediate section of the resilient member and to move relative to the side surface of the side pad to reduce friction between the resilient member and the side surface of the side pad.

2. The assembly of claim 1, wherein the friction-reducing member is a tube of fabric disposed around the resilient member.

3. The assembly of claim 1, wherein the first end of the resilient member is mountable to the curtain at a position spaced from the lateral edge of the curtain.

4. The assembly of claim 1, wherein the friction-reducing member has a first end mountable to the curtain, and a second, free end.

5. The assembly of claim 4, wherein the friction-reducing member is a fabric tube including a tab extending from the first end, the tab being mountable to the curtain.

6. In combination, an assembly comprising:
   a sealing structure mountable to a building wall and including at least one stationary side member, and at least one curtain including a lateral edge disposed adjacent the side member, the side member having a back surface disposed adjacent the building wall, a front surface disposed adjacent the curtain and a side surface joining the front and back surfaces;
   a resilient member having first and second ends and an intermediate section disposed between the first and second ends, the first end being mounted to the curtain adjacent its lateral edge and the second end being mounted adjacent the back surface of the side member such that at least a first portion of the intermediate section is disposed adjacent the side surface of the side member; and
   a friction-reducing member disposed adjacent the first portion of the intermediate section of the resilient member, the friction-reducing member being located adjacent the side surface of the side member between the resilient member and the side surface, the friction-reducing member being adapted to frictionally engage and move with the first portion of the intermediate section of the resilient member and to move relative to the side surface of the side member.

7. For use with a dock seal disposed on a building wall, the dock seal including at least one foam side pad encased in fabric, a rigid backing member disposed between the pad and the building wall, and at least one hanging curtain including a lateral edge disposed adjacent the side pad, a windstrap assembly comprising:
   a resilient member having first and second ends and an intermediate section disposed between the first and second ends, the first and second ends being adapted for mounting to the head curtain and to the backing member, respectively; and
   a friction-reducing member having a first end for securement to the curtain, a second, free end, and a first section disposed intermediate the first and second ends adjacent at least a first portion of the intermediate section of the resilient member, the first section being adapted for location between the resilient member and the side pad, the first section of the friction-reducing member being adapted to frictionally engage and move with the first portion of the intermediate section of the resilient member and to move relative to the side pad, the friction-reducing member comprising a fabric tube including a tab extending from the first end, the tab being mountable to the curtain.

* * * * *